(12) United States Patent
Moorer

(10) Patent No.: US 7,912,724 B1
(45) Date of Patent: Mar. 22, 2011

(54) AUDIO COMPARISON USING PHONEME MATCHING

(75) Inventor: James Moorer, Panacea, FL (US)

(73) Assignee: Adobe Systems Incorporated, San Jose, CA (US)

( * ) Notice: Subject to any disclaimer, the term of this patent is extended or adjusted under 35 U.S.C. 154(b) by 1097 days.

(21) Appl. No.: 11/654,940

(22) Filed: Jan. 18, 2007

(51) Int. Cl.
*G06F 17/21* (2006.01)
*G06F 17/27* (2006.01)
*G10L 15/00* (2006.01)
*G10L 21/00* (2006.01)

(52) U.S. Cl. ............... 704/270; 704/9; 704/10; 704/254; 704/275; 705/1.1

(58) Field of Classification Search .................... 704/10, 704/254, 270
See application file for complete search history.

(56) References Cited

U.S. PATENT DOCUMENTS

| | | | | |
|---|---|---|---|---|
| 4,783,811 | A * | 11/1988 | Fisher et al. | 704/266 |
| 5,884,249 | A * | 3/1999 | Namba et al. | 704/9 |
| 6,029,124 | A * | 2/2000 | Gillick et al. | 704/200 |
| 6,882,970 | B1 * | 4/2005 | Garner et al. | 704/236 |
| 7,212,968 | B1 * | 5/2007 | Garner et al. | 704/251 |
| 7,231,351 | B1 | 6/2007 | Griggs | |
| 7,263,484 | B1 | 8/2007 | Cardillo et al. | |
| 7,313,521 | B1 | 12/2007 | Cardillo et al. | |
| 7,324,939 | B1 | 1/2008 | Cardillo et al. | |
| 7,406,415 | B1 | 7/2008 | Cardillo et al. | |
| 7,475,065 | B1 | 1/2009 | Cardillo et al. | |
| 7,487,086 | B2 | 2/2009 | Griggs | |
| 7,640,161 | B2 | 12/2009 | Morris et al. | |
| 2002/0135618 | A1 * | 9/2002 | Maes et al. | 345/767 |
| 2003/0065655 | A1 * | 4/2003 | Syeda-Mahmood | 707/3 |
| 2006/0036462 | A1 * | 2/2006 | King et al. | 705/1 |
| 2007/0033003 | A1 | 2/2007 | Morris | |
| 2007/0150275 | A1 * | 6/2007 | Garner et al. | 704/235 |
| 2007/0208564 | A1 * | 9/2007 | Tran | 704/254 |
| 2008/0162472 | A1 * | 7/2008 | Cheng et al. | 707/6 |
| 2009/0063151 | A1 | 3/2009 | Arrowod et al. | |

OTHER PUBLICATIONS

U.S. Appl. No. 11/724,975, filed Mar. 16, 2007, James A. Moorer.
Lyons, John. "Introduction to Theoretical Linguistics", 1969, Cambridge University Press.
Jelinek, Bahl and Mercer. "Design of a Linguistic Statistical Decoder for the Recognition of Continuous Speech", May 1975, pp. 250-256, vol. IT-21, No. 3, IEEE IT.
Waibel, Hanazawa, Hinton, Shikano,and, Lang. "Phoneme Recognition Using Time-Delay Neural Networks", Mar. 1989, pp. 328-339, vol. 37, No. 3, IEEE ASSP.
Lippmann. "An Introduction to Computing with Neural Nets", Apr. 1987, pp. 4-22, vol. 4, IEEE ASSP Magazine.
Brown, Peter F. "The Acoustic-Modeling Problem in Automatic Speech Recognition", May 1987, Carnegie-Mellon, Computer Science Department.

(Continued)

*Primary Examiner* — David R Hudspeth
*Assistant Examiner* — Justin W Rider
(74) *Attorney, Agent, or Firm* — Robert C. Kowert; Meyertons, Hood, Kivlin, Kowert & Goetzel, P.C.

(57) ABSTRACT

Audio comparison using phoneme matching is described, including evaluating audio data associated with a file, identifying a sequence of phonemes in the audio data, associating the file with a product category based on a match indicating the sequence of phonemes is substantially similar to another sequence of phonemes, the file being stored, and accessing the file when a request associated with the product category is detected.

28 Claims, 9 Drawing Sheets

OTHER PUBLICATIONS

Rabiner, Lawrence. "A Tutorial of Hidden Markov Models and Selected Applications in Speech Recognition", Feb. 1989, pp. 257-286, vol. 77, No. 2, Proceedings of the IEEE.

Jelinek, Frederick. "Continuous Speech Recognition by Statistical Methods", Apr. 1976, pp. 532-556, vol. 64, No. 4, Proceedings of the IEEE.

Needleman & Wunsch. "A General Method Applicable to the Search for Similarities in the Amino Acid Sequence of Two Proteins",1970, pp. 443-453,vol. 48,No. 3,Journal Molecular Bio.

Nexidia. "Technology: What Can Speech Analytics Do for You?" [Online] Oct. 3, 2007. <http://www.nexidia.com/technology/technology.php>.

World Advertising Research Center. "Product Categories" [Online] Feb. 12, 2008. <http://www.warc.com/landingpages/productcategories/default.asp>.

Google. "Advertise Your Business on Google" [Online] Feb. 12, 2008. <http://adwords.google.com/select/Login>.

Yahoo! Small Business. "Search Engine Marketing: How does it work?" [Online] Feb. 12, 2008. <http://sem.smallbusiness.yahoo.com/searchenginemarketing/basics.php>.

Amazon. "Advertise With Amazon" [Online] Feb. 12, 2008. <http://www.amazon.com/Advertising/b?ie=UTF8&node=276241011>.

Microsoft Digital Advertising Solutions. "Advertise with Us: Microsoft Digital Advertising Solutions" [Online] Feb. 12, 2008. <http://advertising.microsoft.com/home/home>.

Needleman & Wunsch, "A General Method Applicable to the Search for Similarities in the Amino Acid Sequence of Two Proteins," 1970, pp. 443-453, vol. 48, No. 3, Journal Molecular Bio.

Jelinek, et al., "Design of a Linguistic Statistical Decoder for the Recognition of Continuous Speech," May 1975, pp. 250-256, vol. IT-21, No. 3, IEEE IT.

Waibel, Hanazawa, Hinton, Shikana and Lang, "Phoneme Recognition Using Time-Delay Neural Networks," Mar. 1989, pp. 328-339, vol. 37, No. 3, IEEE ASSP.

Lippman, "An Introduction to Computing with Neural Nets," Apr. 1987, pp. 4-22, vol. 4, IEEE ASSP Magazine.

Brown, Peter F., "The Acoustic-Modeling Problem in Automatic Speech Recognition," May 1987, Carnegie-Mellon, Computer Science Department, 12 pages.

Rabiner, Lawrence, "A Tutorial of Hidden Markov Models and Selected Applications in Speech Recognition," Feb. 1989, pp. 257-286, vol. 77, No. 2, Proceedings of the IEEE.

Jelinek, Frederick, "Continous Speech Recognition by Statistical Methods," Apr. 1976, pp. 532-556, vol. 64, No. 4, Proceedings of the IEEE.

* cited by examiner

AUDIO COMPARISON USING PHONEME MATCHING

FIELD OF THE INVENTION

The present invention relates generally to audio recognition and software. More specifically, audio comparison using phoneme matching is described.

BACKGROUND OF THE INVENTION

Online targeting and delivery of content accounts for substantial revenue generated using media such as the Internet and World Wide Web ("web"). For example, online advertisements can be targeted to specific users or types of users at advertising rates that are directly related to the degree of targeting accuracy. In some conventional solutions, user activity can be monitored by observing text entry or other input provided by the user. However, conventional solutions are inaccurate, problematic, and, in many cases, crude.

Conventionally, advertisements are a form of content that may be generated in various types of formats, including text, audio, video, images, photos, and other types. Analyzing content to determine what types of advertisements should be presented to a user is a challenging task often relying upon the observation of user and system inputs, including preferences, behavior, and other parameters. When user behavior is observed, advertisements are presented based on associated identifying information such as metadata. As an example, an automotive advertisement featuring a static display banner advertisement can be identified and placed in an "automotive" category by the advertising agency or advertisement provider of the ad. In some conventional solutions, when advertisements including content other than text or static display information (i.e., video, audio, multimedia) are analyzed problems can occur.

With multimedia content (i.e., content that includes video, audio, text, images, photos, or a combination thereof), determining which content to deliver to a user based on observed behavior, specified preferences, or other criteria is difficult. Conventional solutions for analyzing multimedia content to determine how to classify and target the content also require highly customized application development, requiring high development costs and resources. Using techniques such as speech recognition, content (e.g., audio, video, text, graphics, images, and others) can be analyzed, classified, and categorized, but incur significant costs. For example, audio content (e.g., audio files (e.g., songs, music files, and the like), video containing audio, audio signals transmitted as digital data using protocols such as voice-over-Internet-Protocol ("VoIP"), and others) is difficult to analyze and requires using speech recognition techniques that are processor-intensive, requiring substantial time, processor/compute resources, and highly skilled programmers (i.e., developers) to write complex applications employing analytical techniques such as neural networks and Hidden Markov Models (HMMs) to perform speech recognition. However, conventional solutions employing these techniques are expensive and require substantial system, processor, and development requirements.

Thus, a solution for audio comparison without the limitations of conventional techniques is needed.

BRIEF DESCRIPTION OF THE DRAWINGS

Various examples are disclosed in the following detailed description and the accompanying drawings.

DETAILED DESCRIPTION

Figure 1:
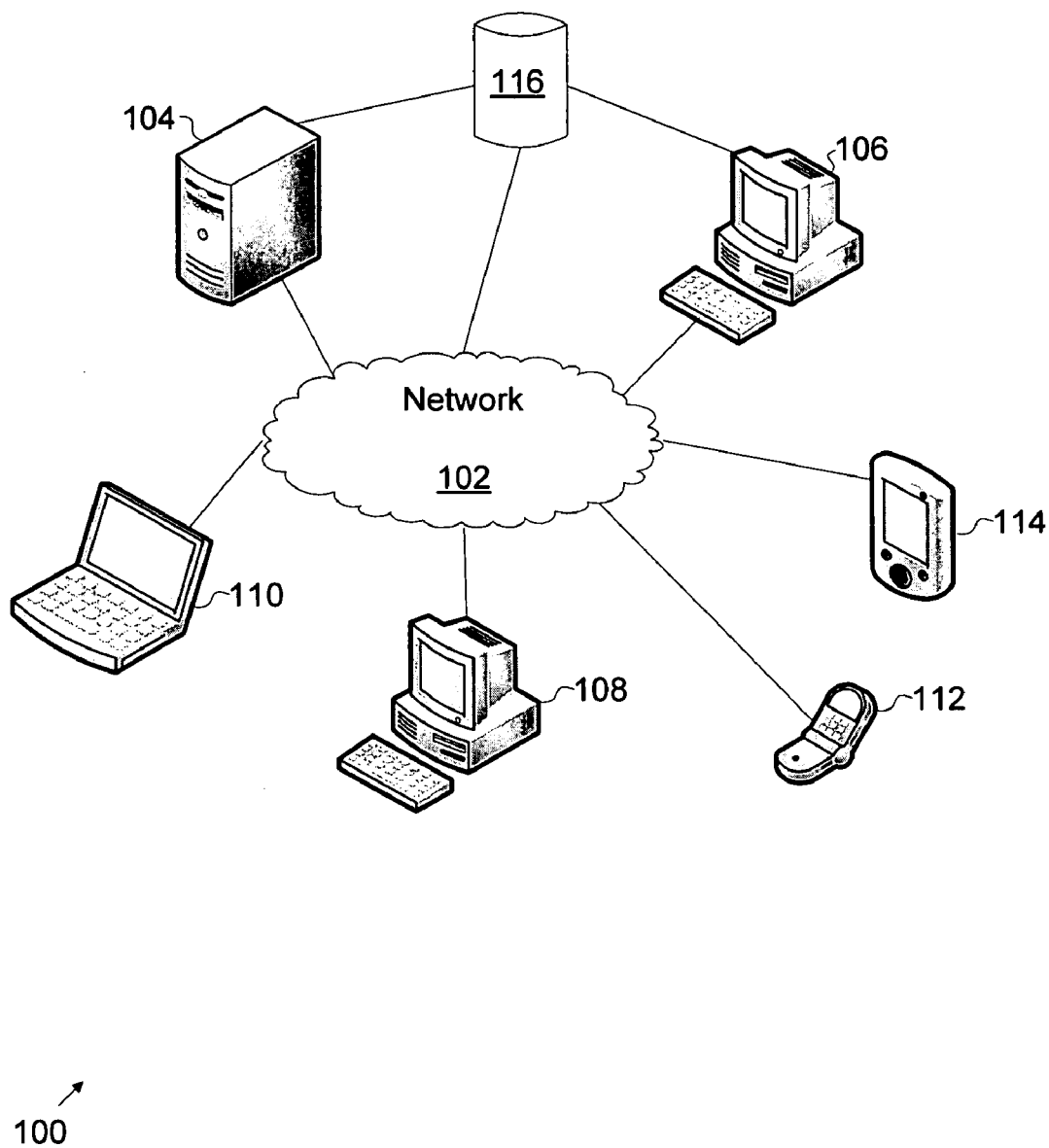
FIG. 1 illustrates an exemplary phoneme recognition topology.

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the embodiments has not been described in detail to avoid unnecessarily obscuring the description.

In some examples, the described techniques may be implemented as an application or as a module or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Flex™, Java™, Javascript™, Ajax, COBOL, Fortran, ADA, XML, HTML, DHTML, XHTML, HTTP, XMPP, and others. Design, publishing, and other types of applications such as Dreamweaver®, Shockwave®, and Fireworks® may also be used to implement the described techniques. The described techniques may be varied and are not limited to the examples or descriptions provided.

Audio comparison using phoneme recognition is described, including evaluating an audio signal or data ("audio data") associated with a file to interpret and resolve one or more phonemes associated with the audio data. Phonemes in audio data may be recognized using any type of phoneme recognition technique. In some examples, phoneme recognition may be performed to identify keywords, categories, or classifications of content that, when matched to keywords found in user behavior, input, or data. When matched, content associated with a given phoneme or set of phonemes may be presented to the user, providing accurate targeting of content. In some examples, advertisements or other content may be evaluated to identify (i.e., recognize) phonemes. Identified phonemes may be used to categorize, index, or otherwise classify an advertisement. When other content (e.g., a VoIP call, user behavior or input, and others) is evaluated and matched to phonemes associated with a given advertisement, the matched advertisement may be delivered, served, and the like. Matches may be scored, ranked, prioritized, or otherwise indicated based on the similarity of a sequence of phonemes within an evaluated audio signal being compared to another sequence of phonemes stored in a database. In some examples, phonemes in a database may be determined from other content (e.g., advertisements including audio content, data, or signals). Depending upon the similarity of the audio signal in the file (i.e., based on phoneme recognition), a score may be generated. The resulting score may be used to search or identify other content for presentation in, for example, a user interface, providing contextual relevance and targeted delivery based on matching or recognition of phonemes or a sequence of phonemes. By using phonemes to match audio content with advertisements stored in a database or repository, advertisements and other content may be targeted more accurately.

FIG. 1 illustrates an exemplary phoneme recognition topology. Here, topology 100 includes network 102, server 104, clients 106-114 and database 116. System 102 may be used to implement the described techniques for audio comparison using phoneme recognition. In some examples, network 102 may be implemented using the Internet, a local area network (LAN), wide area network (WAN), municipal area network (MAN), wireless local area network (WLAN), or any other type or topology of network apart from those described herein. Further, direct and indirect connections and couplings may be provided between clients 106-114 across network 102, which may also be implemented using one or more networks.

In some examples, clients 106-114 may be implemented using various types of endpoint devices. For example, clients 106-108 may be implemented as personal computers (PC) or any other type of computing device. Further, clients 110-114 may be implemented as notebook/laptop computers, cell/smart phones, or personal digital assistants (PDAS), respectively. In other examples, clients 106-114 may be implemented as any type of computing device.

In other examples, server 104 may be implemented and used to deliver (i.e., serve) content, information, or data requested by any of clients 106-114. For example, content requested by client 106 may be performed by using a web browsing application (not shown) installed on client 106. Content may include text, documents, files, images, photos, applications, or any type of information or data. When requested from server 104, content may be delivered to the requesting client (i.e., clients 106-114). In other examples, server 104 may also be a server configured for a given purpose (e.g., ad server, web server, content server, application server, web services, gateway, and others). Techniques for audio comparison using phoneme recognition such as those described herein may be implemented using the above-described system and topology. In some examples, audio comparison using phoneme recognition may be performed locally on one or more of clients 106-114. In other examples, audio comparison using phoneme recognition may be performed remotely or in a distributed manner using server 104 and one or more of clients 106-114. Further, other system, topologies, clients, end and intermediate devices, and other implementation techniques may be used and are not limited to those described above.

Figure 2A:
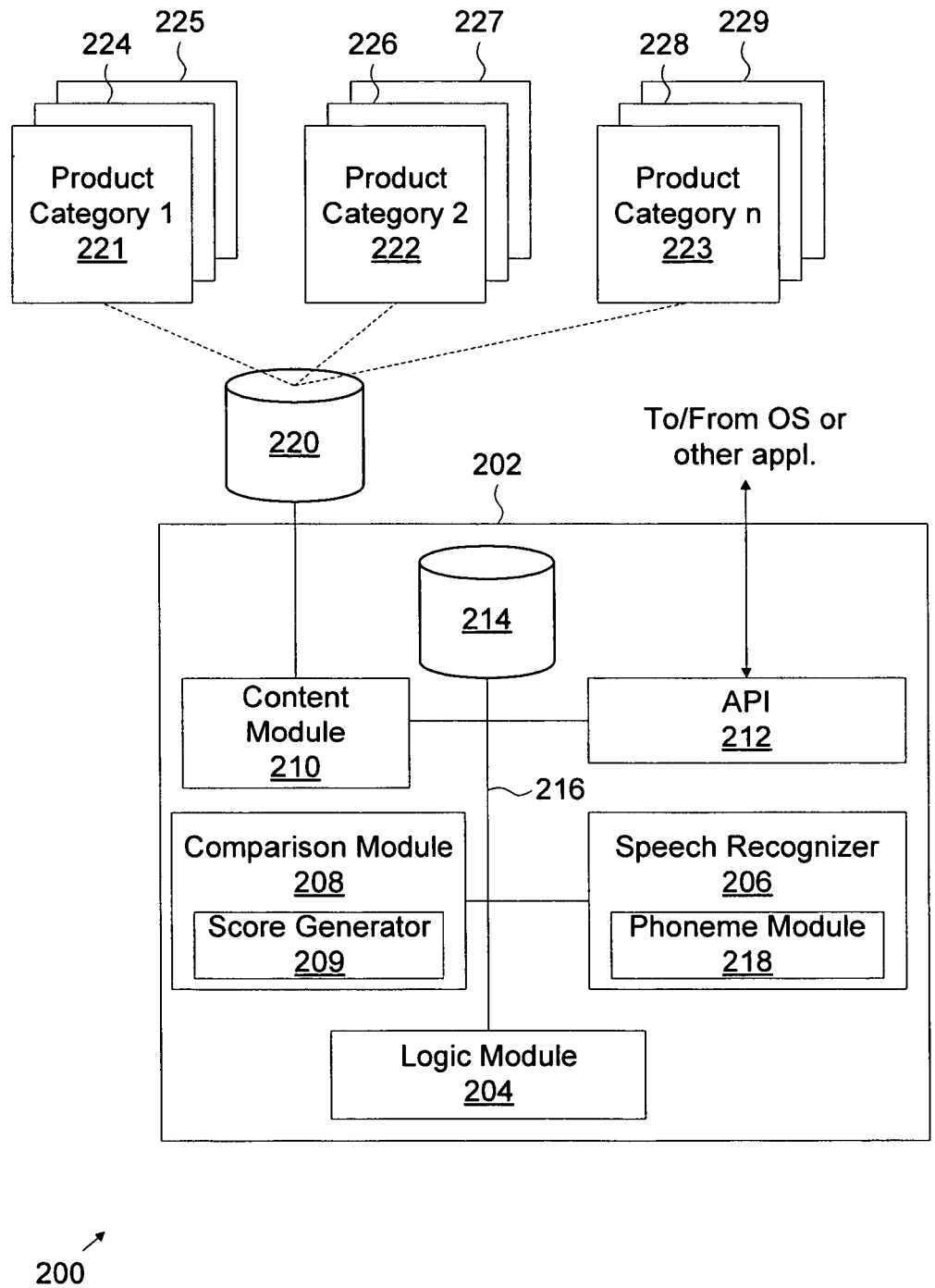
FIG. 2A illustrates an exemplary phoneme recognition system.

FIG. 2A illustrates an exemplary phoneme recognition system. Here, system 200 includes application 202, logic module 204, speech recognizer 206, comparison module 208, score generator 209, content module 210, application programming interface (API) 212, repository 214, and data bus 216. In some examples, logic module 204, speech recognizer 206, comparison module 208, content module 210, application programming interface (API) 212, and repository 214 may be configured to transfer data between each other and, for example, remote repository 220 using data bus 216. Data may be stored in either repository 214 or remote repository 220, which may be networked directly or indirectly to application 202. When stored, data may be logically grouped, categorized, indexed, or otherwise classified according to product categories 221-223. Files 224-229 are illustrated to represent data or groups of data that are stored according to product categories 221-223. Files may be documents, images, text, applications, program code, photos, or any other type of data that may be grouped together as a stream of bits (e.g., "1," "0," or any other data representation using binary, tertiary, or any other type of number system using a different mathematical base) that may be opened, accessed, launched, executed, run, downloaded, or otherwise operated upon as a single unit or instantiation. Contextually, files may also be editorial text, commercial advertisements ("ads"), or other content (e.g., files, advertisements, documents, articles, web sites and pages, videos, web services-delivered content and applications, and others) formatting in various types of formats using different applications (e.g., desktop, web browsing, messaging, e-mail, spreadsheet, and others). In some examples, files, when retrieved from repository 214 or remote repository 220, may be opened and launched based on the type of file retrieved. For example, an ad having video and audio data may be retrieved from repository 214. As another example, an ad having video and audio data may be streamed as a data stream from repository 220. As yet another example, an audio file may be downloaded, retrieved, streamed, or otherwise accessed from repository 214. Logic module 204 may be implemented to provide logic, control, coordination, command, signaling, and other functions and features for application 202. For example, logic module 204 may be configured to determine which of files 224-229 should be retrieved (i.e., a copy is downloaded) in response to a request. A request may be a signal, message, packet, or data that provides information or parameters for use when accessing, retrieving, downloading, or sending a file (e.g., an ad) from repository 214, remote repository 220, or another location.

In some examples, speech recognizer 206 may be implemented as software, hardware, firmware, circuitry, or a combination thereof. Speech recognizer 206 provides speech recognition, linguistic decoding, and other functionality as described below in connection with FIG. 2D. For example, speech recognizer 206 may be used to evaluate a file or other data (e.g., audio signals, audio data, video data, and others) to identify phonemes found in audio signals or data embedded, intermingled, mixed, or otherwise detected in a given file (e.g., files 224-229). As an example, data associated with audio detected, for example, in a given advertisement provided by an ad server or ad serving network, may be evaluated by system 200 to identify a product category. The identified product category may be used to store (i.e., locally or remotely) the advertisement based on detected phonemes found in audio signals or data within the advertisement. When a user, for example, types text or provides other input that identifies a product category (i.e., entering a keyword into a search field), phonemes associated with the user input may be determined and compared against phonemes stored in repositories 214 or 220. A score may be generated to indicate the similarity of one phoneme to another and, if the score meets a user or system-specified threshold, a file (e.g., an advertisement) stored based on a product category associated with the phoneme may be accessed (e.g., retrieved, downloaded, sent, and the like). Once accessed, an advertisement may be presented in an interface or using an application on a display. Thus, the advertisement is selected based on phoneme comparisons that provide highly targeted, accurate matching of the advertisement (i.e., file or other data) to user behavior or input. In other examples, speech recognizer 206 may be implemented differently and is not limited to the examples shown and described.

Here, speech recognizer 206 may also include phoneme module 218, which may be used to identify phonemes within audio signals, data or the like. Phoneme module 218 may be implemented as software, hardware, firmware, circuitry, or a combination thereof. In some examples, phoneme module 026 may be configured to evaluate data provided by other modules (e.g., logic module 204, comparison module 208, content module 210, and others) within application 202 or from sources external to application 202 (e.g., another application, operating system, or data port using API 212). When audio data (e.g., digitized data associated with an audio signal, and the like) is evaluated by phoneme module 218, one or more phonemes may be identified. For example, content including audio data may be received by speech recognizer 206 and evaluated by phoneme module 218 to determine whether any phonemes are present. If audio data is detected, then phoneme module 218 performs an analysis to determine whether one or more phonemes are present. After determining which phonemes are present in audio data, the audio data may be further processed by comparison module 208, logic module 204, content module 210, or modules, functions, or features apart from those shown and described.

In some examples, after audio data has been processed for phonetic recognition of phonemes, the audio data may be classified and stored in repository 214 (local) or remote repository 220 by content module 210. In other examples, the audio data may be further processed by comparison module 208, which may include score generator 209. Here, comparison module 208 may be used to compare phonemes found in audio data with other phonemes previously detected, identified, classified, stored, or otherwise processed. Other phonemes previously processed may be associated with content that has been processed and stored in repository 214 or remote repository 220. For example, phonemes identified in audio data may be compared against a database of other phonemes previously processed. When a comparison is performed by comparison module 208, a score is generated indicating the probability of a match between the phonemes in the audio data and other phonemes previously found in other content. In some examples, the higher the numerical value of the score, the greater the probability that the phonemes are matched against other phonemes associated with content stored in repository 214 or remote repository 220. Here, repository 214 may be a local database, data mart, data warehouse, storage network, or other storage facility used to store content, information, and data. Likewise, remote repository 220 may also be a database, data mart, data warehouse, storage network, or other storage facility used to store content, information, and data, but is in data communication with application 202 using one or more networks. Further, remote repository 220 may be implemented using one or multiple databases, data marts, data warehouses, storage networks, or other storage facilities. As an example, three (3) product categories (i.e., product categories 221-223) are shown, but any number of product categories may be used and are not limited to the examples shown. Likewise, any number of files (i.e., files 224-229 or groups of data representing content such as a video advertisement, an audio recording, a multimedia (i.e., including audio, video, or other visual, graphical, or audio effects) movie, and others)) may be stored in repository 214 and limitation is not drawn to the examples shown and described.

Here, when a probability indicates phonemes identified in audio data are substantially or exactly similar to phonemes associated with content previously processed, then logic module 204 may direct (i.e., instruct, send a signal to, or the like) content module 210 to retrieve the matching content for presentation. The retrieved content may be communicated using API 212 to another application (e.g., web browsing, desktop, e-mail, messaging, or other) or operating system, thus enabling presentation on an interface associated with the observed user's behavior. In other words, user behavior such as typing text or interfacing with an application may be observed. Observed user behavior may be used to identify keywords or product categories from which to retrieve content previously processed using phoneme recognition techniques. By retrieving content that is relevant or related to the user's behavior, highly targeted and accurate advertisements may be presented on a user interface, thus increasing the likelihood that a user may engage in commercial activity. Further, the above-described techniques may be used to process multimedia content (e.g., video, audio, graphical, visual, or other types of effects) to identify phonemes that may be used to classify, store, retrieve, or otherwise operate on content. In some examples, the content may be stored as files according to one or more product categories. Each product category may have one or more phonemes previously associated that may be used by comparison module 208 to match phonemes identified in processed audio data and to retrieve content from product categories based on the match. Phonemes associated with each product category may be recorded manually, automatically, semi-automatically, or in any other manner that may be useful to building a database of phonemes that may be used in comparisons performed by comparison module 208, resulting in the generation of a score (i.e., probability) by score generator 209. In other examples, system 200 and the above-described elements may be varied in implementation, function, or structure and are not limited to the examples provided.

Figure 2B:
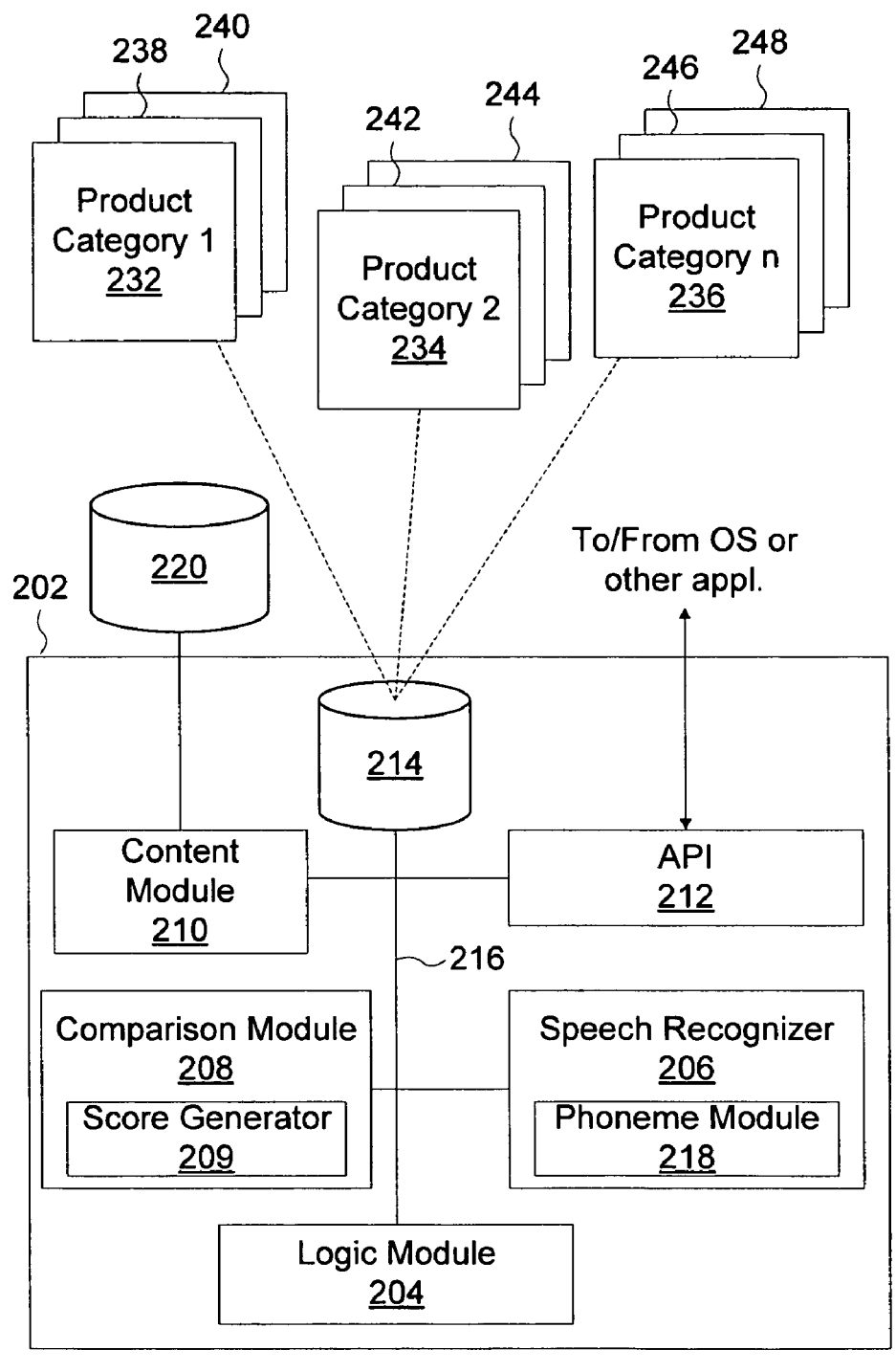
FIG. 2B illustrates an alternative view of an exemplary phoneme recognition system.

FIG. 2B illustrates an alternative view of an exemplary phoneme recognition application. Here, application 202 includes logic module 204, speech recognizer 206, comparison module 208, score generator 209, content module 210, application programming interface (API) 212, repository 214, data bus 216, and phoneme module 218. In some examples, logic module 204, speech recognizer 206, comparison module 208, score generator 209, content module 210, application programming interface (API) 212, repository 214, data bus 216, and phoneme module 218 may be implemented as described above in connection with FIG. 2A. In other examples, logic module 204, speech recognizer 206, comparison module 208, score generator 209, content module 210, application programming interface (API) 212, repository 214, data bus 216, and phoneme module 218 may be implemented differently. Referring back to FIG. 2B, content may also be stored locally in repository 214. Content may be classified, indexed, stored, retrieved, or otherwise operated on according to product categories 232-236, as illustrated by files 238-248. As an example, three (3) product categories (i.e., product categories 232-236) are shown, but any number of product categories may be used and are not limited to the examples shown. Likewise, any number of files (i.e., files 238-248 or groups of data representing content such as a video advertisement, an audio recording, a multimedia (i.e., including audio, video, or other visual, graphical, or audio effects) movie, and others)) may be stored in repository 214 and limitation is not drawn to the examples shown and described. Further, system 230 and the above-described elements may be varied in implementation, function, or structure and are not limited to the examples provided.

Figure 2C:
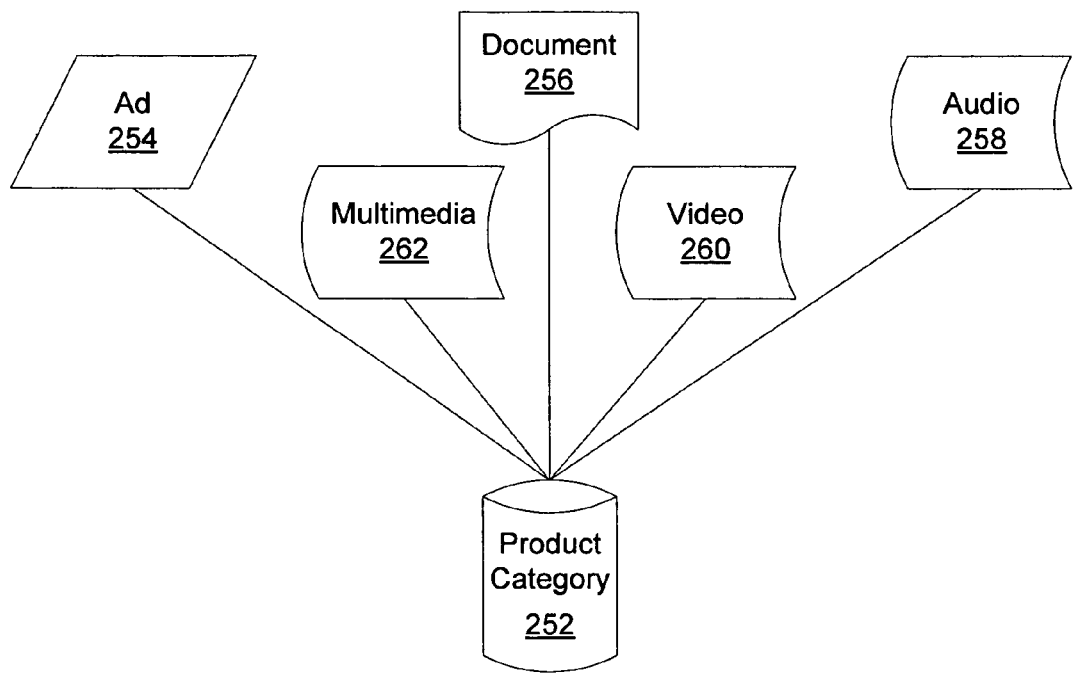
FIG. 2C illustrates an exemplary product category.

FIG. 2C illustrates an exemplary product category. Here, product category 252 may include, as an example, files 254-262. In some examples, product category 252 may include different types of files (e.g., files 224-229 (FIG. 2A), files 238-248 (FIG. 2B)) including advertisement 254, document 256, audio data 258, video data 260, multimedia data 262, and others. Advertisement 254 may be any type of online advertisement, including static or dynamic content such as downloaded or streaming graphics, video, audio, or a combination thereof. Advertisement 254 may be a commercial, billboard, banner, tile, or interactive type of advertisement for a product, service, or brand intended for viewing by a user. In other examples, advertisement 254 may be implemented, designed, or laid out differently. Document 256 may be any type of text, spreadsheet, or other type of file for use with one or more applications (e.g., desktop, distributed, client-server, peer-to-peer, online, and others). Audio data 258 may include sound recordings, music, digital audio files or data, and the like. Video data 260 may include movies, video recordings, downloaded images, moving pictures or graphics, and the like. Multimedia data 262 may include various types of combined content including audio, video, images, still graphics, photos, text, haptic (e.g., vibration or signal-activated piezoelectromechanical interface devices), and others. Other types of files, information, and data may be stored and categorized using product category 252. Further, product category 252 may be used to categorize files, information, and data according to various types of products, goods, services, brands, or other identifiable categorizations. In some examples, product category 252 may be determined using standard industrial classification (SIC) codes or other classification schema. Product category 252 may be identified using any type of classification schema and is not limited to the examples provided herein. In other examples, product category 252 may be used to classify items beyond those described above and is not limited to advertisement 254, document 256, audio data 258, video data 260, or multimedia 262.

Figure 2D:
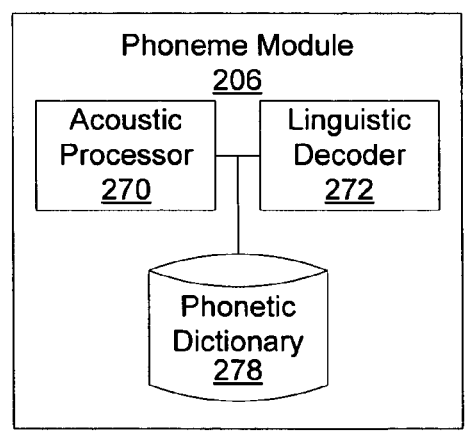
FIG. 2D illustrates an exemplary phoneme module.

FIG. 2D illustrates an exemplary phoneme module. Here, phoneme module 206 includes acoustic processor 270, linguistic decoder 272, and phonetic dictionary 278. In some examples, phoneme module 206 may be implemented as described above in connection with FIGS. 2A and 2B. Referring back to FIG. 2D, phoneme module 206 may include one or more sub-modules (e.g., acoustic processor 270, linguistic decoder 272, phonetic dictionary 278, and others) to perform phonetic recognition and identification of phonemes detected in audio signals or data found within content, such as advertisements, commercials, videos, online (i.e., streamed, downloaded, and the like) files, and others. As an example of phoneme detection and identification functionality, phoneme module 206 may be implemented to provide combined acoustic processing and linguistic decoding features. As an example, audio signals received in the form of an analog signal may be transformed into a digital waveform, encoded into digital data, and transmitted via an application or operating system element to API 212 (FIGS. 2A-2B) in application 202, where the digital data is decoded and sent to phoneme module 206. Within phoneme module 206, the digitized data is processed by acoustic processor 270, which estimates a sequence of phonemes present in the original audio signal (i.e., analog signal). Subsequently, the sequence is sent to linguistic decoder 272, which is configured to search phonetic dictionary 278 for sequences of phonemes that match or are substantially similar to the sequence of phonemes processed by the acoustic processor 270. Identified sequences of phonemes are output to comparison module 208, which compares the identified sequences of phonemes to other sequences of phonemes associated with product categories (e.g., 221-223 (FIG. 2A), 232-236 (FIG. 2B)) and working with logic module 204, for example, retrieves content that is then returned to the application being used for presentation on an interface. As an example, a user is transmitting her voice using a VoIP application on her desktop computer. The above-described techniques allow her voice to be processed as described above and when sequences of phonemes spoken by the user are found to be substantially similar to sequences of phonemes associated with product categories (e.g., 221-223 (FIG. 2A), 232-236 (FIG. 2B)) or files (e.g., files 224-229 (FIG. 2A), files 238-248 (FIG. 2B)), an advertisement, for example, may be selected and presented in the interface on her desktop computer. The above-described example may be varied and is not limited to the descriptions provided. Further, phoneme module 206, acoustic processor 270, linguistic decoder 272, and phonetic dictionary 278 may be varied and is not limited to the examples described above.

Figure 3:
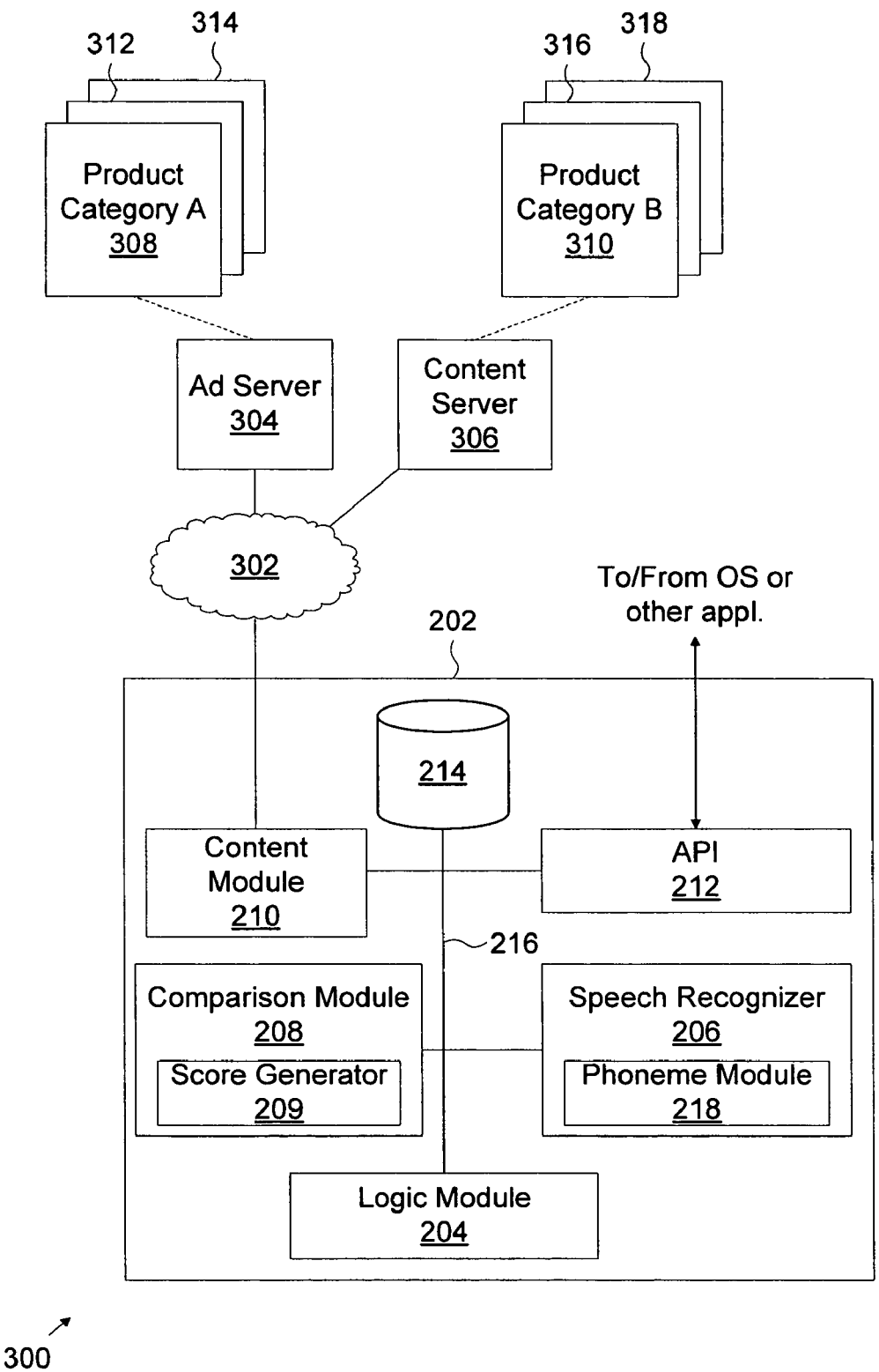
FIG. 3 illustrates an alternative exemplary phoneme recognition system.

FIG. 3 illustrates an alternative exemplary phoneme recognition application. Here, system 300 includes application 202, logic module 204, speech recognizer 206, comparison module 208, score generator 209, content module 210, API 212, repository 214, and data bus 216, which may be implemented as described above in connection with FIGS. 2A-2D. Further, system 300 includes network 302, which provides data communication and networking between application 202 and ad server 302 and content server 306. In some examples, network 302 may be implemented using one or more logical, virtual, or physical networks, equipment (e.g., gateways, routers, servers, and the like) and is not limited to the example shown. Further, ad server 304 and content server 306 may be configured to serve (i.e., access, retrieve, transfer, send, and other operations) files 312-314 and files 316-318, respectively. The number and types of files 312-318 may be varied and are not limited to the examples shown.

Here, ad server 304 may be configured to serve files 312-314 over network 302 to application 202. In some examples, files 312-314 may be online advertisements, commercials, videos, or sound recordings for products, goods, services, or brands of organizations or individuals. In other examples, files 312-314 may be images, photos, text, documents, or other types of information and data. Further, files 312-314 may be served by ad server 304 using a distributed architecture and, for example, stream data, information, or content to application 202.

Additionally, content server 306 may be configured to serve files 316-318 over network 302 to application 202. In some examples, files 316-318 may be content other than online advertisements, commercials, videos, or sound recordings for products, goods, services, or brands of organizations or individuals. For example, files 316-318 may be content requested by a user such as a web page, website, Internet site found at a uniform resource locator (URL), uniform resource indicator (URI), or other address. In other examples, files 316-318 may be images, photos, text, documents, or any other type of information or data stored locally or remotely. Further, files 312-314 may be served by ad server 304 using a distributed architecture to, for example, stream information or data to application 202. Other types of servers than ad server 304 or content server 306 may be implemented in system 300 and the above-described techniques are not limited to the examples provided. Further, system 300 and the above-described elements may be varied in implementation, function, or structure and are not limited to the examples provided.

Figure 4A:
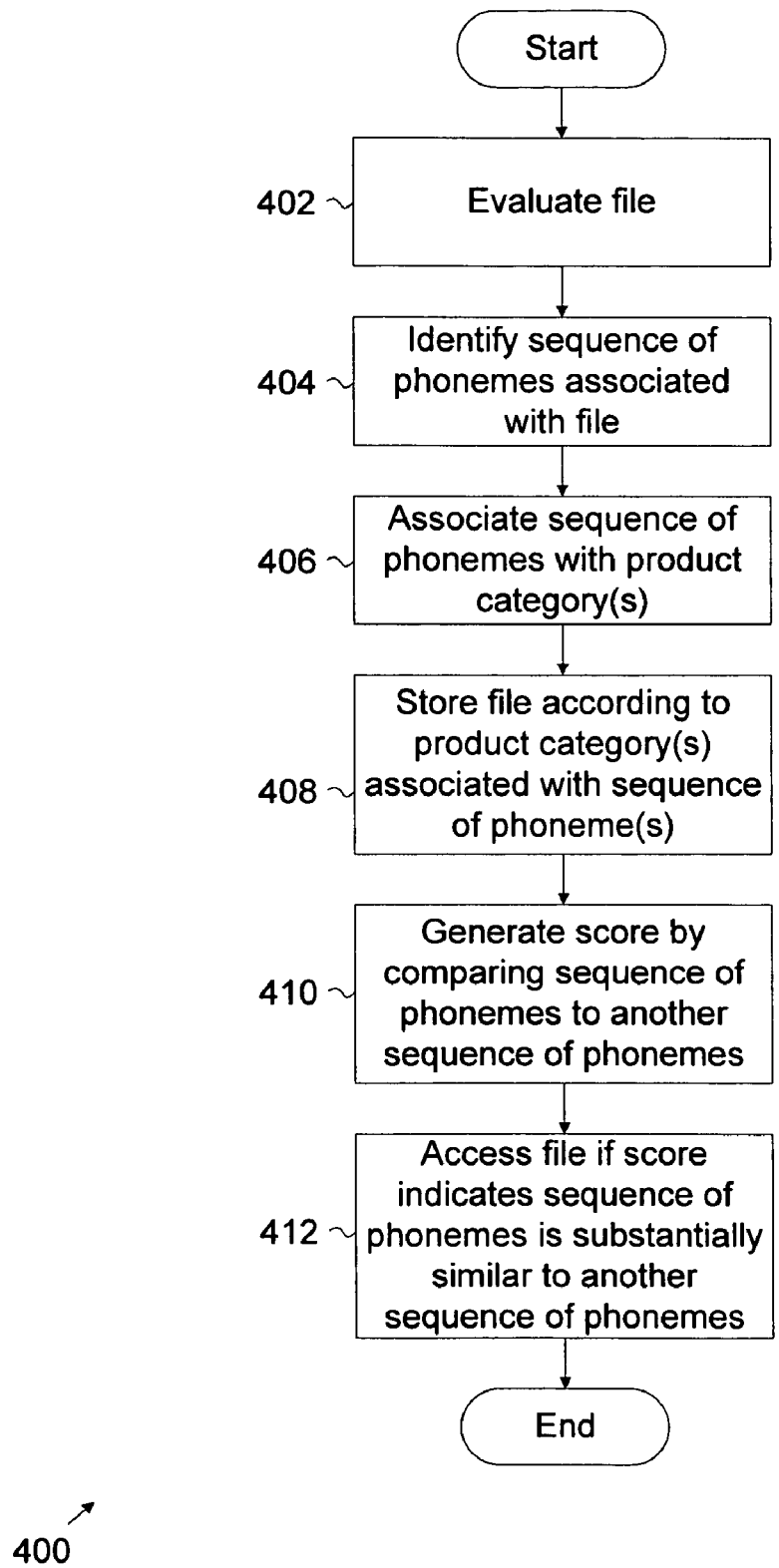
FIG. 4A illustrates an exemplary phoneme recognition process.

FIG. 4A illustrates an exemplary phoneme recognition process. Here, process 400 starts by evaluating a file having audio data (402). Phonemes associated with the file (i.e., the audio data) are identified using techniques such as those described above (404). Once identified, phonemes associated with the evaluated file are further associated with one or more product categories that correspond to keywords that match the phonemes (406). Once associated with a product category, the file is stored and classified (i.e., indexed) for later retrieval if a request for content associated with the product category is detected (408). When user behavior or other input is detected, phonemes identified with the user input are compared to phonemes associated with keywords for product categories to determine whether there is a match, resulting in the generation of a score (410). In some examples, a match may occur when a sequence of phonemes (i.e., a word) is similar or substantially similar to a sequence of phonemes representing a keyword associated with a product category. In other examples, a score is generated based on the probability of a given sequence of phonemes (i.e., a word) matching a keyword associated with a product category. Still further, if a score may be a numerical weighted or non-weighted probability assigned to a given sequence of phonemes. If the probability that the evaluated file has a sequence of phonemes that are substantially similar to another sequence of phonemes associated with a given product category (i.e., the probability is greater than or equal to a given threshold) then a file associated with the product category may be accessed (e.g., retrieved, downloaded, copied, sent, and other operations) (412). In other examples, the above-described process may be varied and is not limited to the processes or sub-processes described above.

Figure 4B:
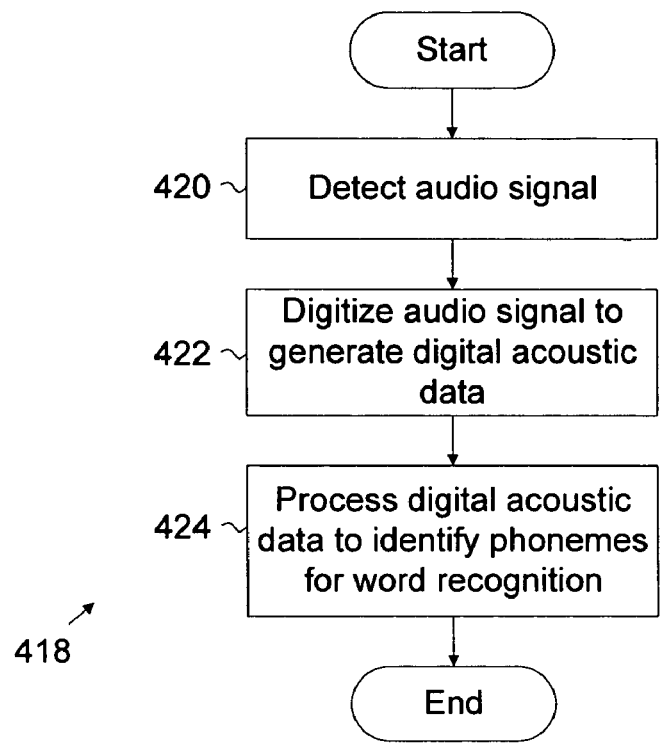
FIG. 4B illustrates an exemplary phoneme recognition sub-process.

FIG. 4B illustrates an exemplary phoneme recognition sub-process. In some examples, sub-process 418 further describes evaluating a file (402; FIG. 4A), as provided above. Here, an audio signal is detected within a file (420). The detected audio file is then digitized (i.e., transformed or encoded from an analog signal waveform to digital signal waveform) to generate digital acoustic data (i.e., audio data) (422). The digital acoustic data is then processed to identify phonemes or sequences of phonemes (424), as described below in greater detail in connection with FIG. 4C. Further, phonemes or sequences of phonemes may be further evaluated as byte strings and, when compared, similarities are sought and scored depending upon the closeness or similarity of a match between compared byte strings. Scores may be numerically weighted or not weighted and, if an exact match is not found, then the highest score may be used to determine which product category or file to select in response to comparing the phonemes or sequences of phonemes. In other examples, the above-described sub-process may be varied and is not limited to the examples provided.

Figure 4C:
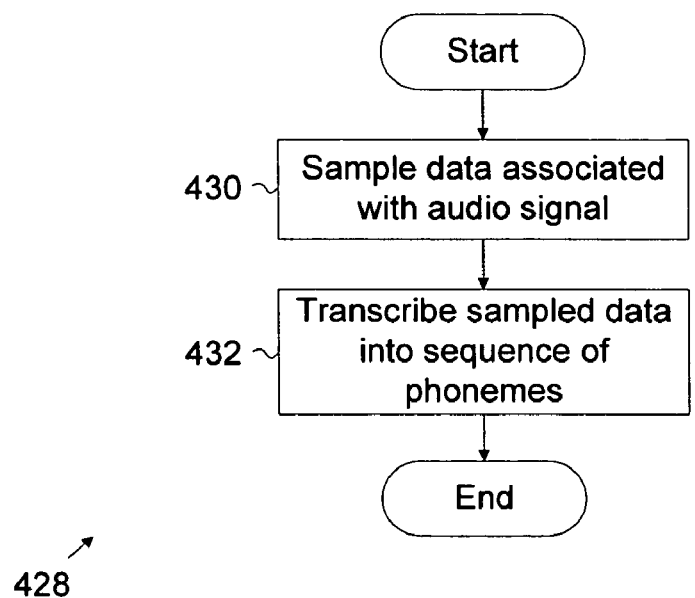
FIG. 4C illustrates another exemplary phoneme recognition sub-process.

FIG. 4C illustrates another exemplary phoneme recognition sub-process. In some examples, sub-process 428 further describes processing digital acoustic data (424; FIG. 4B). Here, digitized acoustic data associated with an audio signal is sampled (430). The sampled data is transcribed into one or more phonemes, which may be used to perform comparisons, as described herein (432). In other examples, the above-described sub-process may be varied and is not limited to the examples provided.

Figure 5:
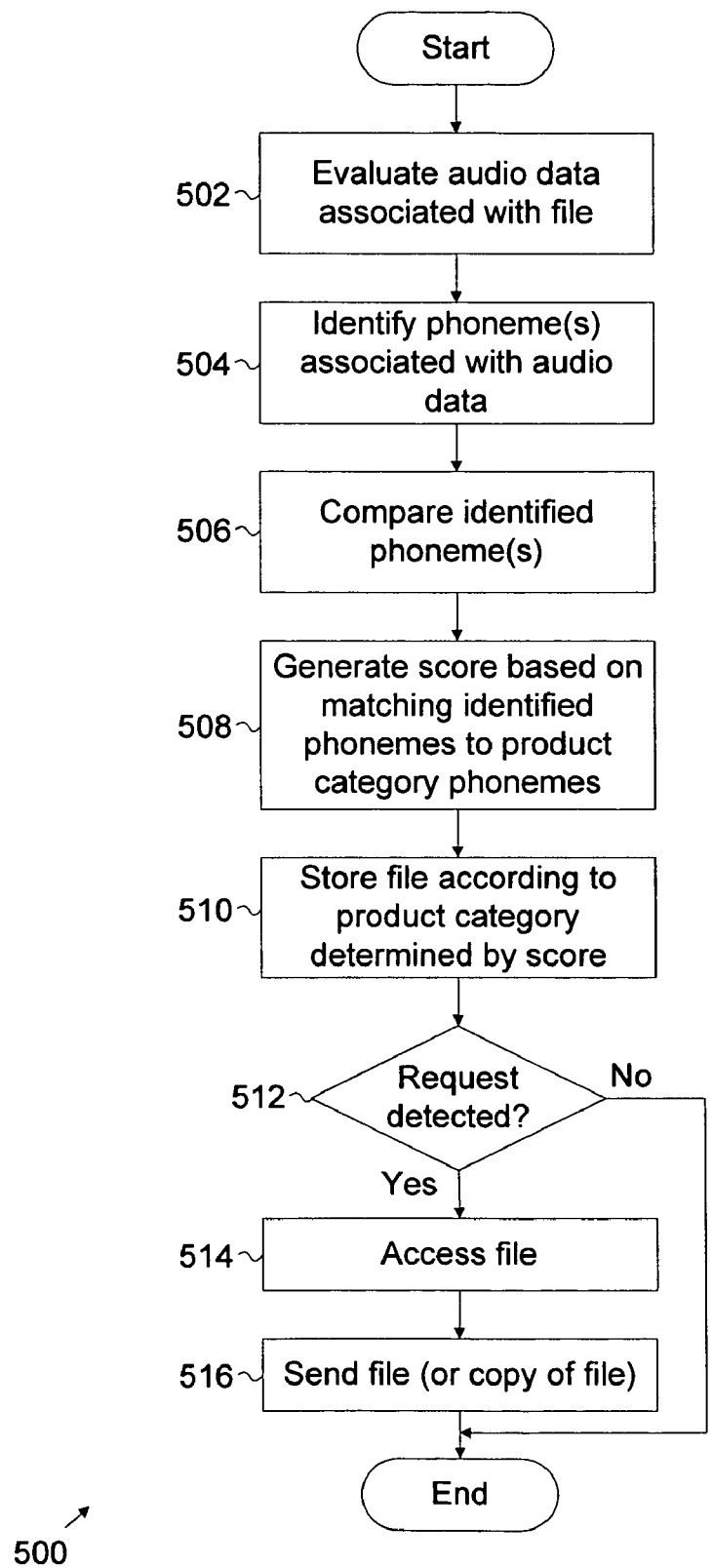
FIG. 5 illustrates an exemplary phoneme recognition process.

FIG. 5 illustrates an exemplary phoneme recognition process. In some examples, process 500 is a phoneme recognition process that may be alternatively used in place of the above-described techniques. Here, audio data associated with a file is evaluated (502). One or more phonemes are identified from the audio data (504). The identified phonemes are compared against phonemes stored and associated with product categories (e.g., product categories 221-223 (FIG. 2A); product categories 232-236) (506). A score is generated based on matching the identified phonemes to the product category phonemes, providing an association between the evaluated file and the product category (508). Further, the evaluated file may be stored based on the association with the product category (510). A determination is then made as to whether a request or other input has been detected that may involve accessing the evaluated file (512). As an example, the determination may be made by comparing a keyword received from user behavior (e.g., a user entering a term or word into a field in an interface, entry of a particular URL, URI, or other address in a web browser, submission of data over a web-services delivered or implemented application, data entry into a spreadsheet, document, or other file in use on a desktop application, or others), system-specified or observed behavior, pre-set parameters, criteria, and others. As another example, keywords may be identified and gathered passively while a user is interacting with an application. The passively gathered keywords may be resolved into byte strings that are compared to byte strings associated with keywords or other descriptive identifying information associated with each product category. Further, a request may be explicitly or implicitly made. For example, a user may request a given file that has been evaluated and stored based on phoneme recognition techniques such as those described above. As another example, a request may be made by a system in use when user or system behavior provides information or data that may be used to identify a product category and select a file associated with that product category.

Here, if a request is not detected, the process ends. If a request is detected, then a file may be accessed (514) and sent (or a copy thereof) to the requesting location or destination (516). The above-described process may be varied in implementation, design, order, and function and is not limited to the examples provided above.

Figure 6:
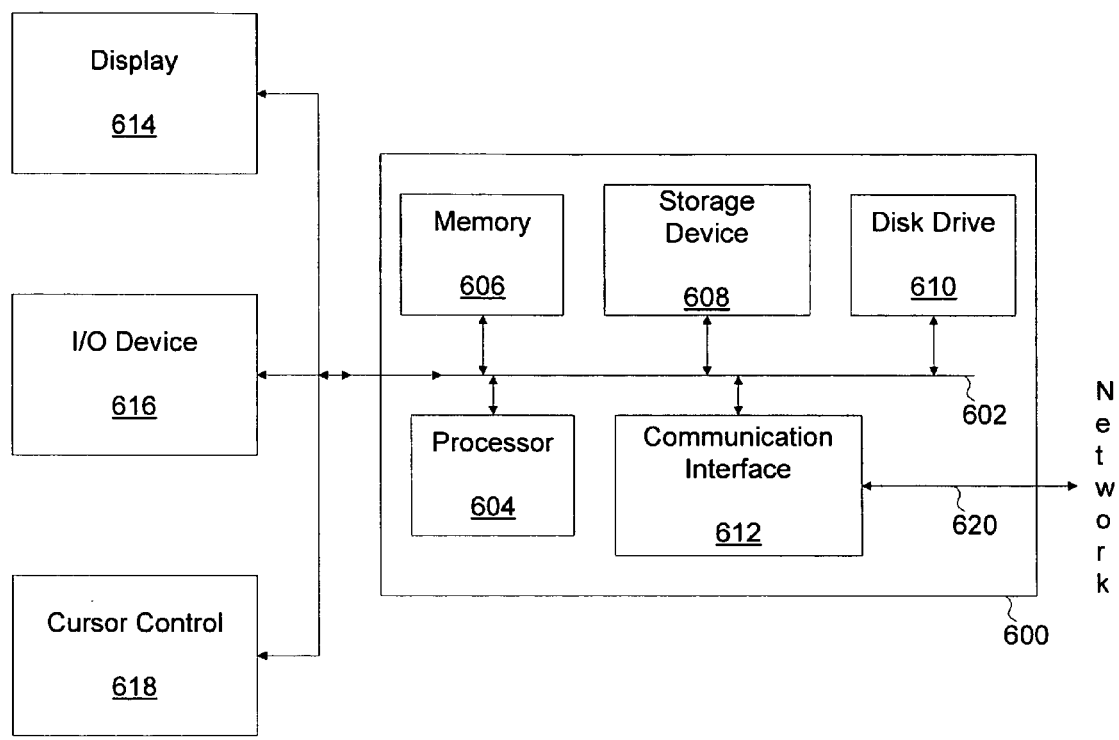
FIG. 6 illustrates an exemplary computer system suitable for phoneme recognition.

FIG. 6 illustrates an exemplary computer system suitable for phoneme recognition. In some examples, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball).

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, hard-wired circuitry may be used in place of or in combination with software instructions for implementation.

The term "computer readable medium" refers to any medium that participates in providing instructions to processor 604 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 606.

Transmission media includes coaxial cables, copper wire, and fiber optics, including wires that comprise bus 602. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 600. According to some examples, two or more computer systems 600 coupled by communication link 620 (e.g., LAN, PSTN, or wireless network) may perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed is:

1. A method, comprising:
    performing by a computer:
        accessing a set containing a limited number of phoneme sequences, wherein each phoneme sequence comprises one or more phonemes;
        associating each advertising file of a plurality of advertising files with one or more of the limited number of phoneme sequences, wherein said associating is based on comparing at least one sequence of one or more phonemes present within audio data of the advertising file to the set of phoneme sequences;
    analyzing requested content, wherein said analyzing is based on comparing at least one sequence of one or more phonemes present within audio data of the requested content to the set of phoneme sequences; and
    matching one of the plurality of advertising files to the requested content, wherein said matching is based on results of said associating and said analyzing.

2. The method of claim 1, wherein the limited number of phoneme sequences is associated with a limited number of corresponding product categories.

3. The method of claim 2, wherein the corresponding product categories comprise a standard classification of products.

4. The method of claim 1, further comprising generating a score to indicate similarity between the at least one sequence of one or more phonemes present within audio data of the requested content and the set of phoneme sequences.

5. The method of claim 4, further comprising associating the requested content with a product category, wherein said associating is based on the generated score.

6. The method of claim 4, wherein the score comprises a probability that one of the at least one sequence of one or more phonemes present within audio data of the requested content matches one of the limited number of phoneme sequences.

7. The method of claim 4, wherein said matching is based on a threshold for the score.

8. The method of claim 1, further comprising sampling the audio data of the requested content and transcribing the sampled audio data into the at least one sequence of one or more phonemes.

9. The method of claim 1, wherein said associating and said analyzing comprise determining if a byte string associated with a sequence of phonemes is substantially similar to a byte string of another sequence of phonemes.

10. The method of claim 1, wherein the one of the plurality of advertising files matched to the requested content belongs to a product category that is indicated by the at least one sequence of one or more phonemes present within audio data of the requested content.

11. The method of claim 1, further comprising ranking results of said comparing the at least one sequence of one or more phonemes present within audio data of the requested content to the set of phoneme sequences.

12. The method of claim 1, further comprising displaying the advertising file matched to the requested content.

13. The method of claim 1, wherein the advertising file is an online advertisement.

14. The method of claim 1, wherein the advertising file comprises video data.

15. The method of claim 1, wherein the advertising file comprises multimedia content.

16. The method of claim 1, further comprising storing the plurality of advertising files according to product categories, wherein said storing is based on the limited number of phoneme sequences in the set.

17. The method of claim 1, wherein the plurality of advertising files are classified according to product categories.

18. The method of claim 1, wherein the limited number of phoneme sequences is determined from product category classification schema.

19. A method, comprising:
    performing by a computer:
        receiving an indication of requested content;
        analyzing the requested content, wherein said analyzing is based on comparing at least one sequence of one or more phonemes present within audio data of the requested content to a limited number of previously identified phoneme sequences, wherein each of the limited number of previously identified phoneme sequences is associated with one or more of a given collection of advertising files; and
        matching one of the given collection of advertising files to the requested content, wherein said matching is based on said analyzing.

20. The method of claim 19, wherein the limited number of previously identified phoneme sequences is associated with a limited number of corresponding product categories.

21. The method of claim 19, wherein the limited number of previously identified phoneme sequences is determined from product category classification schema.

22. The method of claim 19, further comprising displaying the advertising file matched to the requested content.

23. A system, comprising:

a processor; and a memory coupled to the processor, wherein the memory stores program instructions executable by the processor to perform:

accessing a set containing a limited number of phonemes sequences, wherein each phoneme sequence comprises one or more phonemes;

associating each advertising file of a plurality of advertising files with one or more of the limited number of phoneme sequences, wherein said associating is based on comparing at least one sequence of one or more phonemes present within audio data of the advertising file to the set of phoneme sequences;

analyzing requested content, wherein said analyzing is based on comparing at least one sequence of one or more phonemes present within audio data of the requested content to the set of phonemes sequences; and matching one of the plurality of advertising files to the requested content, wherein said matching is based on results of said associating and said analyzing.

24. The system of claim 23, wherein the limited number of phoneme sequences is associated with a limited number of corresponding product categories.

25. The system of claim 23, wherein the program instructions are further executable by the processor to perform generating a score to indicate similarity between the at least one sequence of one or more phonemes present within audio data of the requested content and the set of phoneme sequences.

26. A system, comprising:

a processor; and a memory coupled to the processor, wherein the memory stores program instructions executable by the processor to perform:

receiving an indication of requested content;

analyzing the requested content, wherein said analyzing is based on comparing at least one sequence of one or more phonemes present within audio data of the requested content to a limited number of previously identified phoneme sequences, wherein each of the limited number of previously identified phoneme sequences is associated with one or more of a given collection of advertising files; and matching one of the given collection of advertising files to the requested content, wherein said matching is based on said analyzing.

27. A non-transitory computer readable storage medium storing computer program instructions that when executed by a computer cause the computer to perform:

accessing a set containing a limited number of phoneme sequences, wherein each phoneme sequence comprises one or more phonemes;

associating each advertising file of a plurality of advertising files with one or more of the limited number of phoneme sequences, wherein said associating is based on comparing at least one sequence of one or more phonemes present within audio data of the advertising file to the set of phoneme sequences;

analyzing requested content, wherein said analyzing is based on comparing at least one sequence of one or more phonemes present within audio data of the requested content to the set of phoneme sequences; and matching one of the plurality of advertising files to the requested content, wherein said matching is based on results of said associating and said analyzing.

28. A non-transitory computer readable storage medium storing computer program instructions that when executed by a computer cause the computer to perform:

receiving an indication of requested content;

analyzing the requested content, wherein said analyzing is based on comparing at least one a sequence of one or more phonemes present within audio data of the requested content to a limited number of previously identified phoneme sequences, wherein each of the limited number of previously identified phoneme sequences is associated with one or more of a given collection of advertising files; and matching one of the given collection of advertising files to the requested content, wherein said matching is based on said analyzing.

* * * * *